United States Patent
Yamashita

(10) Patent No.: US 6,354,575 B1
(45) Date of Patent: Mar. 12, 2002

(54) OMNIDIRECTIONAL VIBRATION DAMPER FOR PROTECTION OF ELECTRONIC APPLIANCES OR THE LIKE

(75) Inventor: Norio Yamashita, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/526,827

(22) Filed: Mar. 16, 2000

(30) Foreign Application Priority Data

Mar. 31, 1999 (JP) ............................................ 11-092444
Dec. 1, 1999 (JP) ............................................ 11-342077

(51) Int. Cl.⁷ ................................................ F16F 7/00
(52) U.S. Cl. ........................ 267/136; 245/638; 188/379
(58) Field of Search ................................ 188/378–380; 248/619–638; 267/136–53

(56) References Cited

U.S. PATENT DOCUMENTS

| | | | | |
|---|---|---|---|---|
| 5,180,147 A | * | 1/1993 | Andersson et al. | 267/136 |
| 5,775,472 A | * | 7/1998 | Osterberg et al. | 188/378 |
| 5,944,297 A | * | 8/1999 | Flower et al. | 248/636 |
| 5,975,510 A | * | 11/1999 | Miyazaki | 267/140.15 |
| 6,050,554 A | * | 4/2000 | Tournier | 267/140.11 |

\* cited by examiner

*Primary Examiner*—Christopher P. Schwartz
(74) *Attorney, Agent, or Firm*—Woodcock Washburn LLP

(57) ABSTRACT

An omnidirectional vibration damping system comprising a pair of dampers of identical make mounted between a carrier rigidly carrying an electronic instrument or like object of protection and a rigid support therefore, the dampers being positioned in axial alignment with each other in positions of symmetry with respect to the center of mass of the object. The carriers have webs laid parallel to a pair of opposed bearing surfaces of the support, each web having formed thereon a hollow boss extending at right angles therefrom. Each damper has a nut extending with clearance through the hollow boss of one carrier and having one end held fast against the bearing surface of the support by receiving a bolt from outside the support. Formed on the other end of the nut is a flange laid parallel to the bearing surface and farther away therefrom than the carrier web. Two damping rings of elastic material and preformed shapes act between nut flange and carrier web, between carrier web and support, between nut flange and support, and between nut and carrier boss, thereby mitigating vibrations both in a plane parallel to the each bearing surface of the support and in a direction at right angles therewith.

13 Claims, 6 Drawing Sheets

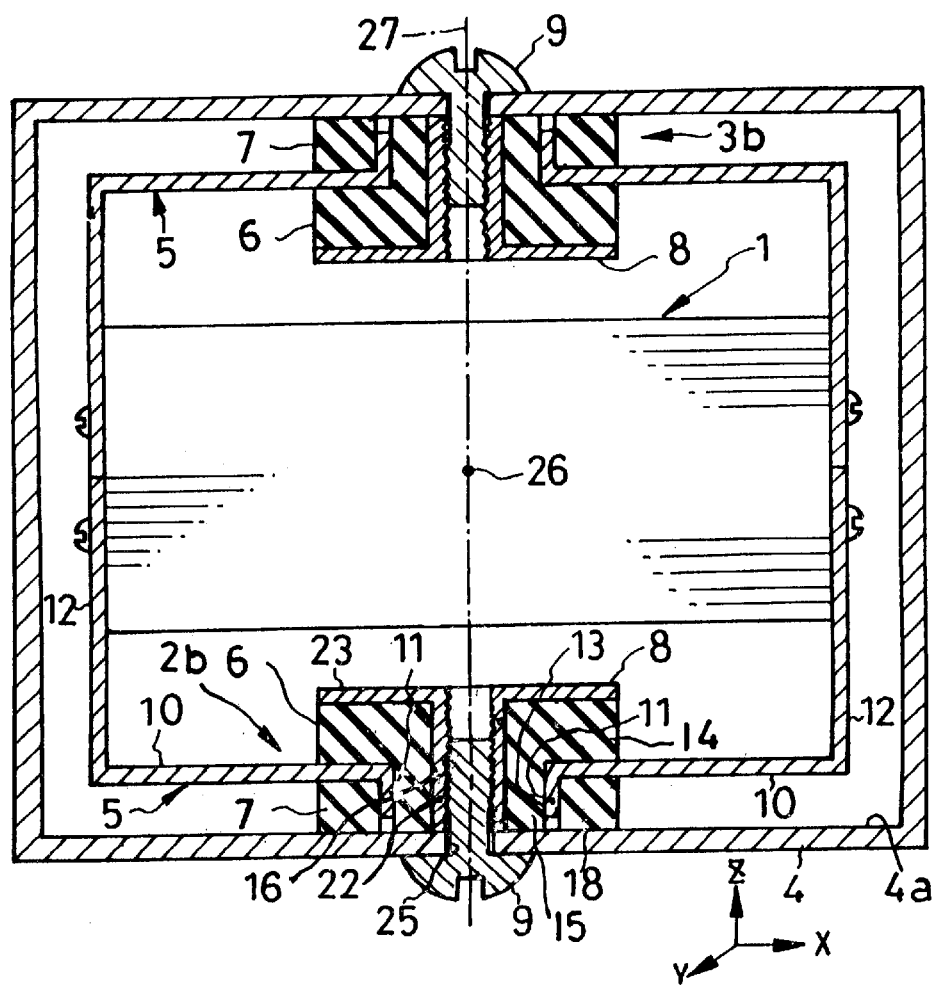

OMNIDIRECTIONAL VIBRATION DAMPER FOR PROTECTION OF ELECTRONIC APPLIANCES OR THE LIKE

BACKGROUND OF THE INVENTION

This invention relates to vibration dampers, particularly to those of the class suitable for protection of electronic, electrical, and/or mechanical appliances from external vibrations or shocks that might be applied thereto in multiple directions, among other applications.

Vibrations and shocks are potentially detrimental to such electronic instruments as video cameras, video tape recorders, and disk drives, all with precision-made mechanical parts and components built into them. Such devices must therefore be, and indeed have been, protected by vibration dampers of one kind or another, particularly when they are going to be put to use where such vibrations or shocks are imminent or possible.

A variety of vibration dampers have been suggested and used for the above and many other purposes. Such conventional devices are all based upon the principle of either springing, viscous damping (utilizing the viscosity of a liquid), friction damping, magnetic damping, or inherent damping (rubber, felt, cork, etc.), or upon combinations of any two or more of the listed types. Dampers for the purposes of this invention are required, among other things, to be compact and inexpensive. No doubt best meeting these requirements are inherent dampers.

Conventionally, however, a majority of simple inherent dampers have not been explicitly designed to be omnidirectional, more or less equally effective in multiple directions. The truth of this statement will be acknowledged in light of the fact that the known devices of the class under consideration have had to be installed in many different locations and orientations for protecting an instrument from vibrations in as many different directions.

Another weakness of the prior art simple inherent dampers is that they mostly lack inbuilt limit stops for positively arresting the displacement of the object of protection beyond the limits within which the dampers can function as such. Combined use of external limit stops has therefore been necessary to preclude any undue displacement, which might result in damage or destruction, of the object relative to the supporting structure.

SUMMARY OF THE INVENTION

In consideration of the foregoing state of the art the present invention aims at the provision of a vibration damper of the inherent type that, although so simple and inexpensive in construction, works in multiple directions.

Another object of the invention is to incorporate limit stops within the damper of the character defined for restricting the displacement of the object of protection and the deformation of the damper beyond the limit of elasticity.

Yet another object of the invention is to protect a precision-made machine or device of any kind from multi-directional vibrations or shocks using a minimum number, typically two, of dampers each attaining the above recited objects.

Briefly, the invention may be summarized as an omnidirectional vibration damper to be mounted between an object of protection such as electronic, electrical, and/or mechanical appliances, and a support therefor. The damper comprises a carrier for rigidly carrying an object of protection, the carrier having a first portion laid parallel to a bearing surface of the support, and a second portion extending at right angles with the first portion. Also included are damping means formed from an elastic material and interposed between the support and the carrier.

Preferably, the damper according to the invention additionally comprises fastener means rigidly coupled to the support. The fastener mean comprises a first portion laid parallel to the bearing surface of the support and farther away therefrom than the first portion of the carrier, and a second portion extending at right angles with the first portion of the fastener means and concentrically through the second portion of the carrier toward the bearing surface of the support. In a preferred embodiment this second portion of the fastener means takes the form of an internally screw-threaded tube, or nut, in which a bolt is engaged for fastening the fastener means to the support. The damping means acts between the first portions of the carrier and the fastener means, between the first portion of the carrier and the bearing surface of the support, between the first portion of the fastener means and the bearing surface of the support, and between the second portions of the carrier and the fastener means.

Thus the damper of this invention can mitigate vibrations both in a plane parallel to the bearing surface of the support, in which extend the first portions of both the carrier and the fastener means, and in a direction at right angles therewith, in which extend the second portions of the carrier and the fastener means. The damper is therefore omnidirectional.

It will also be appreciated that, coupled fast to the support and partly concentrically received in the second portion of the carrier, the fastener means coacts with the support to positively limit the displacement of the carrier, and hence of the object of protection, in every possible direction.

The present invention also features an onmidirectional vibration damping system comprising only two dampers, each of the construction summarized above, for protecting a desired object. Arranged in axial alignment with each other and in positions of symmetry with respect to the center of mass of the object, the minimal number of dampers can nevertheless effectively protect the object from multidirectional vibrations or shocks.

The above and other objects, features and advantages of this invention and the manner of achieving them will become more apparent, and the invention itself will best be understood, from a study of the following description and attached claims, with reference had to the accompanying drawings showing the preferred embodiments of the invention.

BRIEF DESCRIPTION OF THE DRAWINGS

FIG. 8 is a view similar to FIG. 1 but showing a modified vibration damping system according to the invention;

DESCRIPTION OF THE PREFERRED EMBODIMENTS

Figure 1:
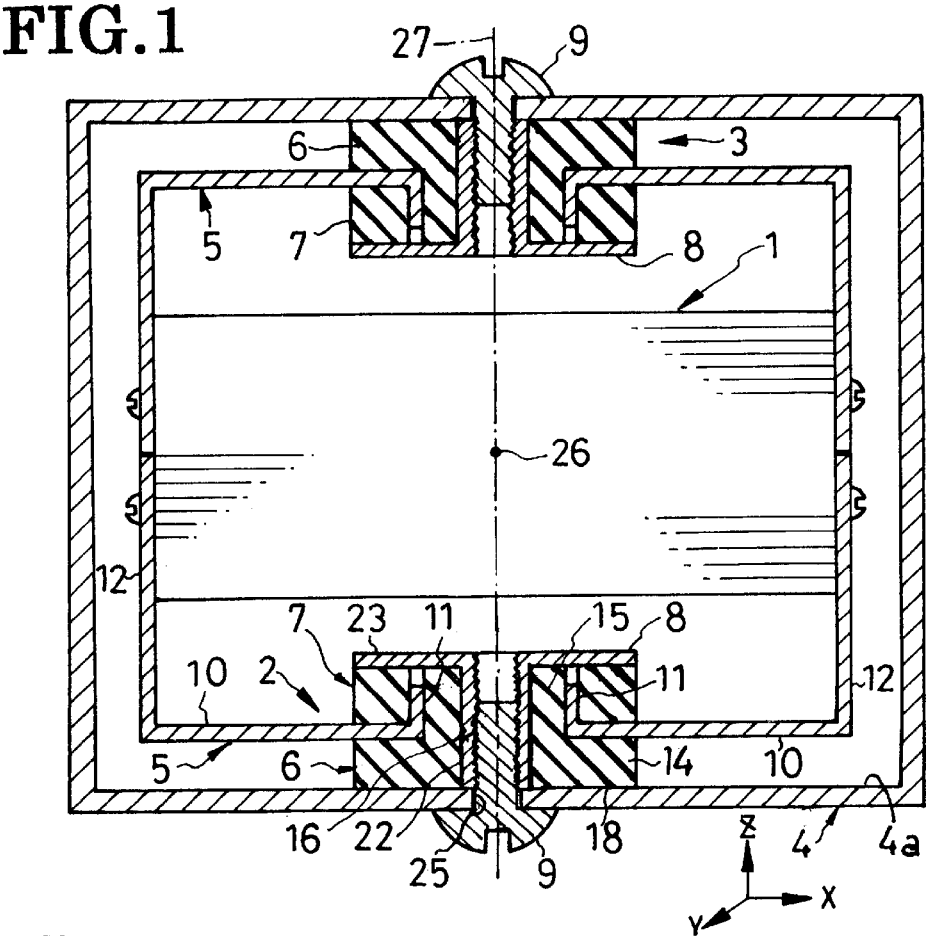
FIG. 1 is a sectional view, taken through the line A—A in FIG. 2, of an electronic instrument as supported by the vibration damping system according the present invention.
Figure 2:
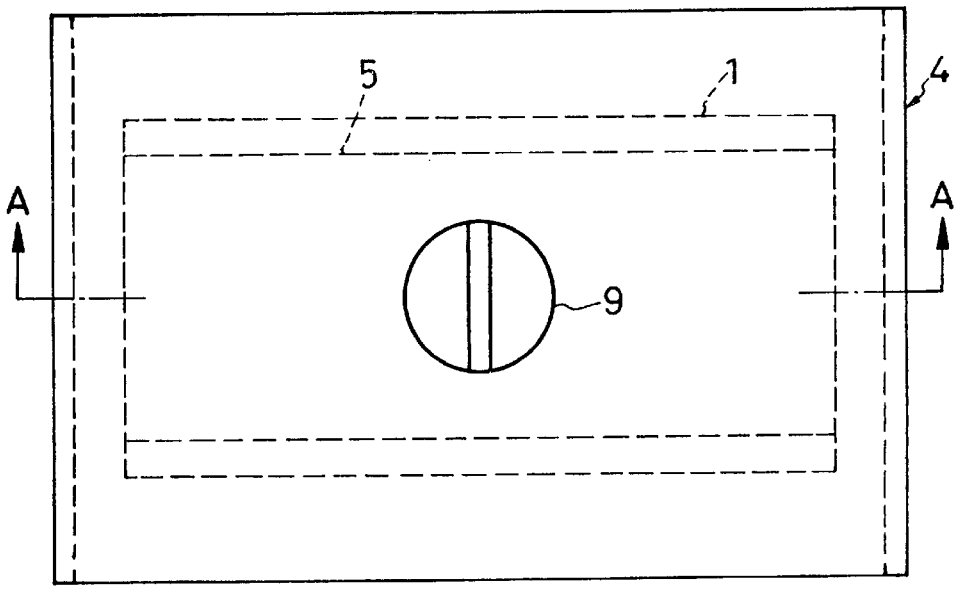
FIG. 2 is a plan view of the showing of FIG. 1.

The present invention will now be described in detail as applied to the protection of an electronic instrument. In FIGS. 1 and 2 is shown an electronic instrument 1 mounted via a pair of vibration dampers 2 and 3 to a support 4. The invention is specifically directed to the construction of each vibration damper 2 or 3 as well as to the vibration control system comprising both dampers. Since the two vibration dampers 2 and 3 are identical in construction, only one of them, 2, will be detailed, it being understood that the same detailed description applies to the other, 3.

Figure 3:
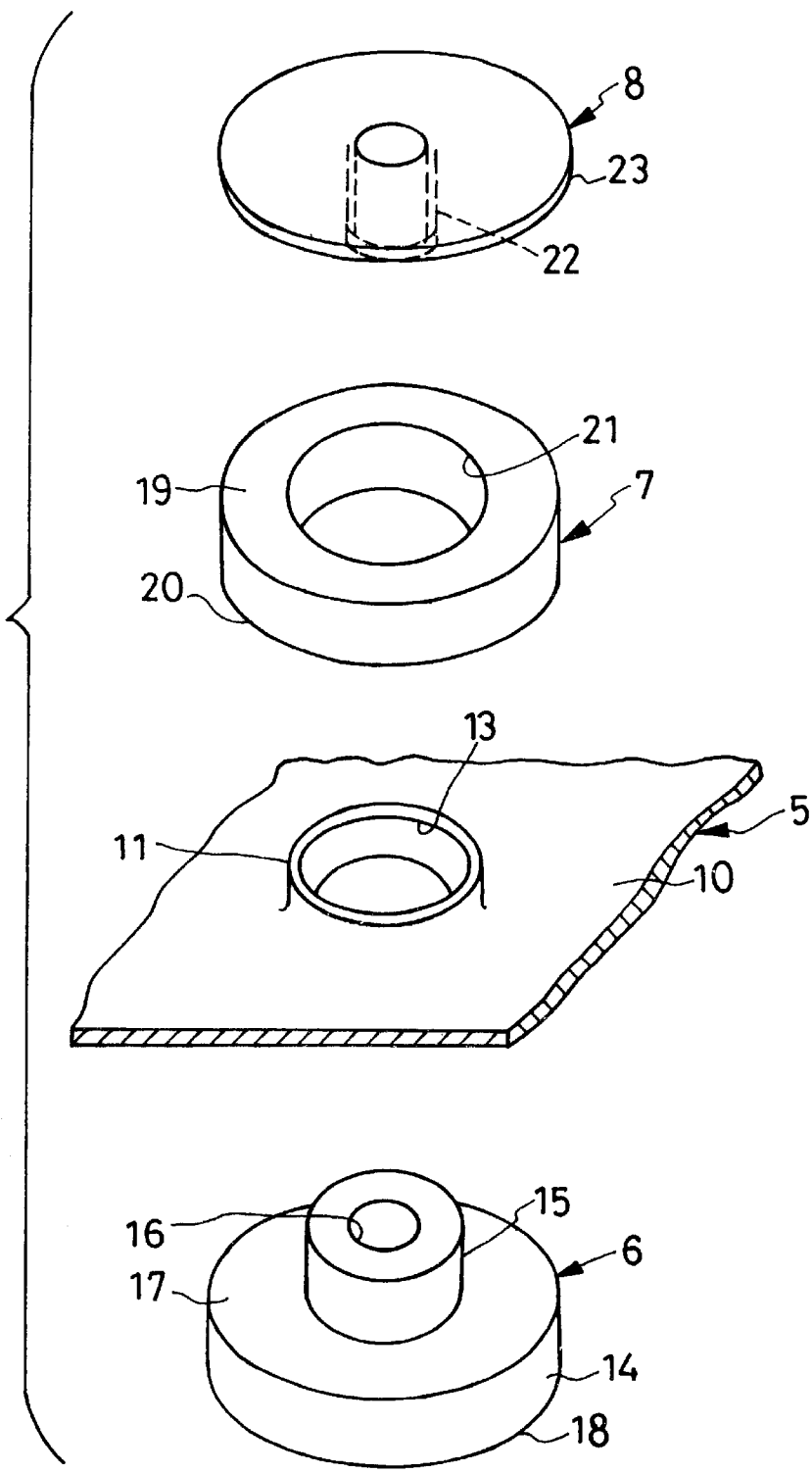
FIG. 3 is an exploded perspective view, partly shown broken away, of one of the pair of vibration dampers included in the FIG. 1 damping system.
Figure 4:
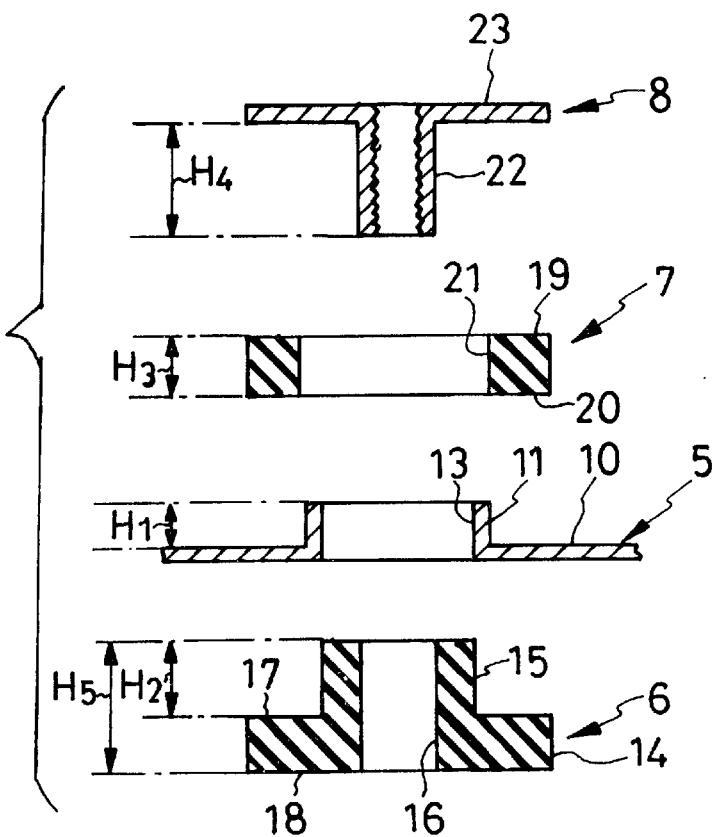
FIG. 4 is an exploded axial section, partly shown broken away, of one of the pair of vibration dampers included in the FIG. 1 damping system.

The construction of the representative damper 2 will be understood by referring also to FIGS. 3 and 4 which illustrate its component parts on an enlarged scale. The damper 2 comprises, in addition to the support 4 which is shared by both dampers 2 and 3 and which may be considered a part of each damper for the purposes of this invention, a carrier 5 coacting with its counterpart 5 of the other damper 3 for rigidly carrying the electronic instrument 1, fastener means 8 including a fastener element shown as a screw or bolt 9, and two damping rings 6 and 7 acting between the support 4 and the carrier 5, between the support 4 and the fastener means 8, and between the carrier and the fastener means.

Boxlike or tubular in shape and thoroughly enclosing the instrument 1 and the dampers 2 and 3, the support 4 is made from sheet metal and is sturdy enough to protect the instrument, resisting shocks and pressures that are likely to be exerted thereon in use. All but the two damping rings 6 and 7 of the component parts of the damper 2 are metal made. The damping rings 6 and 7 are molded from any such elastic materials as natural and synthetic rubbers or elastomers typically including silicone in the form of gel or jelly.

As revealed by FIG. 1, the carrier 5 is generally U shaped as seen in this figure, including a flat web 10 with a tubular boss 11, and a pair of flanges 12 bent right-angularly from the web and screwed or otherwise secured to the instrument 1. The web 10 is laid parallel to the bearing surface 4a of the support 4. As will be noted also from FIGS. 3 and 4, the tubular boss 11 on the web 10 projects right-angularly therefrom in a direction away from the bearing surface 4a of the support 4. This hollow boss 11 may be formed either by stamping of the sheet metal of which the carrier 5 is made or by welding a short tube to the sheet metal.

The fastener means 8 with the screw or bolt 9 function to fasten the carrier 5 to the support 4 via the damping rings 6 and 7. Included are a nut or internally screw-threaded tube 22 with an outside diameter less than the inside diameter of the tubular boss 11 of the carrier 5, and a flange 23 of disklike shape formed on one end of the nut 22. The nut 22 extends concentrically and with substantial clearance through the hollow boss 11 of the carrier 5 and, in this particular embodiment of the invention, has one end held against the bearing surface 4a of the support 4. Formed on the other end of the nut 22, the flange 23 is parallel to the bearing surface 4a of the support 4 and farther away therefrom than the web 10 of the carrier 5.

The bolt 9 is engaged in the nut 22 from outside the support 4 through a hole 25 created therein. The nut 22 with the flange 23 is therefore rigidly coupled to the support 4.

FIGS. 3 and 4 also best illustrate the two damping rings 6 and 7. The first damping ring 6 is a coaxial, one-piece construction of a larger diameter portion 14 and a smaller diameter portion 15, with a hole 16 extending axially through both portions. Having a surface 18 held against the bearing surface 4a of the support 4, the larger diameter portion 14 of the first damping ring 6 surrounds part of the nut 22 of the fastener means 8 and partly engaged between the bearing surface 4a and the web 10 of the carrier 5. Projecting from the other surface 17 of the larger diameter portion 14, the smaller diameter portion 15 surrounds part of the nut 22 of the fastener means 8 and surrounded by the hollow boss 11 of the carrier 5. The diameter of the hole 16 in this first damping ring 6 is approximately equal to the outside diameter of the nut 22, so that the first damping ring relatively closely fits over the nut.

The second damping ring 7 is a simple ring having a pair of opposite surfaces 19 and 20 and a hole 21 extending axially therethrough. Having an inside diameter approximately equal to the outside diameter of the hollow boss 11 of the carrier 5, the second damping ring 7 fits over that hollow boss and is engaged between the web 10 of the carrier 5 and the flange 23 of the fastener means 8.

Referring specifically to FIG. 4, the axial dimension $H_1$ of the hollow boss 11 of the carrier 5 is less than the axial dimension $H_2$ of the smaller diameter portion 15 of the first damping ring 6 and also than the axial dimension $H_3$ of the second damping ring 7. The axial dimension $H_2$ of the smaller diameter portion 15 of the first damping ring is approximately equal to the axial dimension $H_3$ of the second damping ring 7 plus the thickness of the web 10 of the carrier 5. Thus, as will be seen by referring back to FIG. 1, the hollow boss 11 of the carrier 5 is spaced from the flange 23 of the fastener means 8.

Before the damper 2 is assembled and mounted in position as shown in FIG. 1, the axial dimension $H_4$ of the nut 22 of the fastener means 8 is less than the axial dimension $H_5$ of the first damping ring 6. The first damping ring 6 is compressed, however, to the same dimension as the nut 22 when the bolt 9 is fully driven into the nut as in FIG. 1.

In assembling and mounting the damper 2, the carrier 5 may be fastened to the electronic instrument 1 either before or after the two damping rings 6 and 7 are mounted to the carrier. The smaller diameter portion 15 of the first damping ring 6 may be inserted in the hollow boss 11 of the carrier 5, which has been, or is not yet, fastened to the instrument 1, until the surface 17 of the larger diameter portion 14 hits the web 10 of the carrier. Then the second damping ring 7 may be fitted over the carrier boss 11 so that the surface 20 of the ring rests against the web 10. Then the nut 22 of the fastener means 8 may be inserted in the hole 16 in the first damping ring 6 from its smaller diameter portion 15 until the flange 23 on the nut comes into abutment against the ends of both first 6 and second 7 damping rings.

Next comes the step of mounting the damper 2 to the support 4, it being understood that the instrument 1 has already been attached to the carrier 5. With the surface 18 of the first damping ring 6 held against the bearing surface 4a of the support 4, the bolt 9 may be driven into the nut 22 via the hole 25 in the support until the nut 22 comes to butt on the bearing surface 4a. Although greater in axial dimension than the nut 22 as aforesaid, the first damping ring 6 will be compressed as the bolt 9 is driven into the nut and become equal in axial dimension to the nut when this nut comes into abutment against the bearing surface 4a of the support 4.

Now has been completed the assemblage and mounting of the damper 2. The other damper 3 may be assembled and mounted in place in a like manner. The completion of the mounting of both dampers 2 and 3 is tantamount to the elastic, vibration-proof mounting of the instrument 1 to the support 4.

A reconsideration of FIG. 1 will show that the web 10 of the carrier 5 is caught between the larger diameter portion 14 of the first damping ring 6 and the second damping ring 7. Since the hollow boss 11 of the carrier 5 is normally spaced from the flange 23 of the fastener means 8, the damping rings 6 and 7 are capable of elastic deformation in both directions along the z-axis indicated in FIG. 1.

The hollow boss 11 of the carrier 5, on the other hand, is sandwiched between the smaller diameter portion 15 of the first damping ring 6 and the second damping ring 7. These damping rings are therefore elastically deformable in any direction in a plane containing the x- and y-axes in FIG. 1. Thus the damper 2 can protect the instrument 1 from triaxial vibrations and shocks.

FIG. 1 further indicates that only a minimal number, two, of dampers 2 and 3 are used for protecting the instrument 1 by virtue of their omnidirectional damping capabilities. For most effectively guarding the instrument 1 the two dampers 2 and 3 are arranged in axial alignment with each other in positions on symmetry along a notional line 27 extending through the center of mass 26 of the instrument 1. Being effective in both vertical and horizontal directions, the two aligned dampers 2 and 3 will favorably protect the instrument 1 from vibrations that might be applied thereto in any direction.

The following is a list of advantages gained by the specific embodiment of the invention disclosed above:

1. The damper 2, though so simple and inexpensive in construction, is thoroughly tridimensional in its effectiveness.

2. Rigidly coupled to the support 4, the fastener means 8 function as stops for limiting the displacement, and preventing the destruction, of the damping rings 6 and 7.

3. The carrier 5, damping rings 6 and 7, and fastener means 8 are all concentric with one another, so that they can be readily assembled by interfitting them sequentially.

4. The component parts of the damper 2 are inseparably coupled together, and the damper mounted in position between carrier and support, simply as the bolt is driven into the flanged nut.

5. The degree of elasticity of the damper in any of the x-, y- and z-axes is adjustable by changing the pertinent dimensions of the damping rings 6 and 7.

6. Only two dampers 2 and 3 are needed to protect the instrument 1 from omnidirectional vibrations.

Second Form

Figure 5:
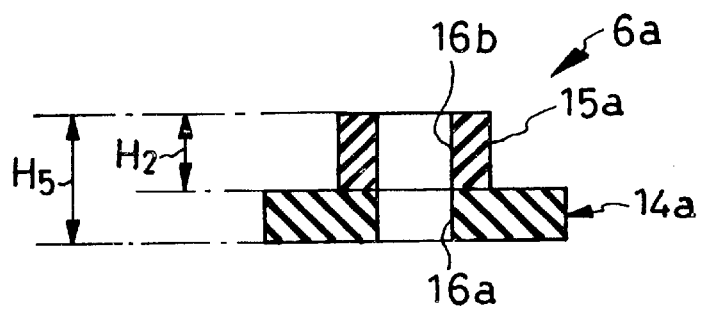
FIG. 5 an axial section through a modified set of damping rings.

A second preferred form of vibration damper according to the invention features a modified first damping ring 6a, FIG. 5, which is for use in the first disclosed damper 2 or 3 in substitution for the first disclosed first damping ring 6. The modified first damping ring 6a is divided into a larger diameter member 14a and a smaller diameter member 15a, both having holes 16a and 16b of the same diameter. The two ring members 14a and 15a can be molded from the same material or from different materials.

In assembling and mounting the damper incorporating the modified first damping ring 6a, the smaller diameter ring member 15a may first be inserted in the hole 13, FIG. 4, in the web 10 of the carrier 5. Then the second damping ring 7 may be fitted over the hollow boss 11 of the carrier web 10. Then the nut 22 of the fastener means 8 may be inserted in and through the hole 16b in the smaller diameter ring member 15a and then in the hole 16a in the larger diameter ring member 14a. The rest of the procedure is as set forth above in connection with the first embodiment of the invention.

The damper with the divided first damping ring 6a is just as effective as that including the integral first damping ring 6. The fabrication of two simple ring members of different diameters is nevertheless easier than that of the integral ring of two different diameter portions. As required or desired, moreover, different materials with different elasticities may be employed for the two ring members 14a and 15a in each specific application of the invention.

Third Form

Figure 6:
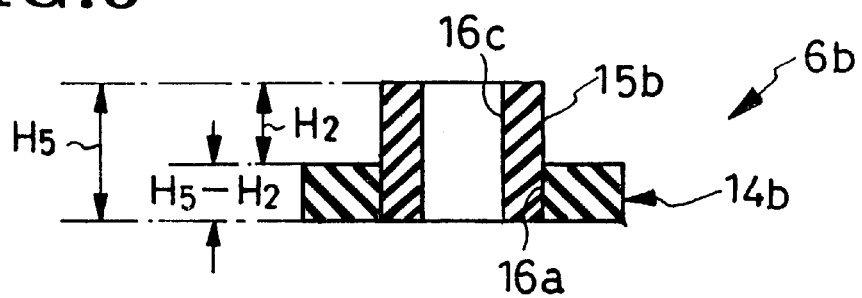
FIG. 6 is an axial section through another modified set of damping rings.

In FIG. 6 is shown another modified first damping ring 6b, also for use in the first disclosed damper 2 or 3 in place of the first damping ring 6. This second modification is similar to the first modified damping ring 6a in that the ring is divided into a larger diameter member 14b and a smaller diameter member 15b, but differs therefrom in that the larger diameter member 14b has a hole 16a large enough to receive the smaller diameter member 15b. This smaller diameter member 15b has a hole 16c extending axially therethrough just like the hole 16 in the FIG. 4 damping ring 6. The axial dimension $H_5$ of the smaller diameter member 15b is the same as that of the damping ring 6, and the dimension $H_2$ of that part of the smaller diameter member 15b which projects from the larger diameter member 14b is the same as that of the smaller diameter portion 15 of the damping ring 6.

This second modified damping ring 6b gains the same advantages as does the FIG. 5 damping ring 6a.

Fourth Form

Figure 7:
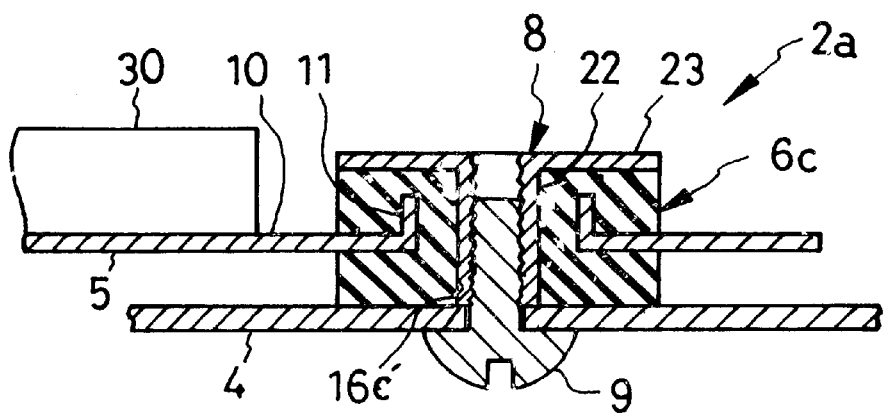
FIG. 7 is an axial section, with parts shown broken away, through another preferred form of vibration damper according to the invention.

FIG. 7 represents a further modified vibration damper 2a according to the invention, featuring a one-piece construction 6c of what are shown in FIGS. 1–4 embodiment as the first 6 and second 7 damping rings. Thus the integral damping ring 6c is shaped like the combination of these first disclosed damping rings 6 and 7, that is, a cylinder having a hole 16c' extending axially therethrough, the hole being equivalent to the hole 16 in the first damping ring 6. The nut 22 is received in the hole 16c'.

It will be also noted from FIG. 7 that the integral damping ring 6c is molded in place on the carrier 5, enveloping its hollow boss 11 and the neighboring part of the web 10. This is possible by the familiar insert molding method.

In FIG. 7 is further shown an electronic circuit board 30 mounted on the web 10 of the carrier 5. This showing represents an additional possible use of the invention.

Fifth Form

In each of the dampers 2b and 3b shown in FIG. 8 the hollow boss 11 of the carrier 5 extends from the web 10 toward the bearing surface 4a of the support 4, instead of away from the bearing surface as in all the foregoing embodiments. In conformity with this modified carrier configuration the two damping rings 6 and 7 are reversed in position. Thus the first damping ring 6 has its larger diameter portion 14 surrounding part of the nut 22 of the fastener means 8 and partly engaged between the web 10 of the carrier 5 and the flange 23 of the fastener means 8, and its smaller diameter portion 15 surrounding the rest of the nut 22 and surrounded by the hollow boss 11 of the carrier 5. The second damping ring 7 surrounds the hollow boss 11 of the carrier 5 and is engaged between the bearing surface 4a of the support 4 and the web 10 of the carrier 5.

This embodiments provides the advantage that the first damping ring 6 can be molded in one piece with the fastener means 8 for greater use of assemblage.

Sixth Form

Figure 9:
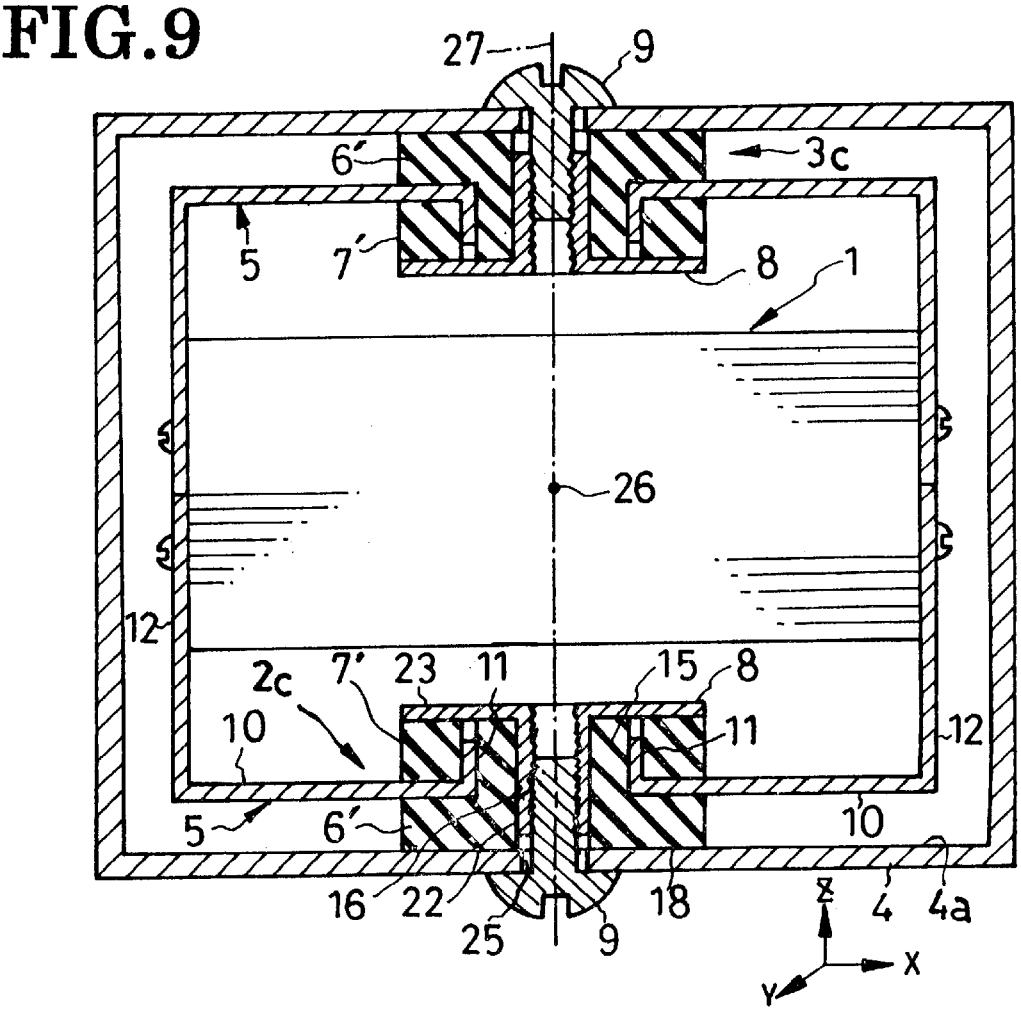
FIG. 9 is also a view similar to FIG. 1 but showing another modified vibration damping system according to the invention.

The dampers 2c and 3c seen in FIG. 9 have each damping rings 6' and 7' of greater axial dimensions, relative to the nut 22 of the fastener means 8, than their counterparts 6 and 7 of all the previous embodiments. Consequently, the nut 22 of the fastener means 8 is spaced from the bearing surface 4a of the support 4, unlike the foregoing embodiments in which the nut contacts the bearing surface.

The provision of the spacing between support 4 and nut 22 is preferable in cases where the damping rings 6' and 7' in use are not sufficiently elastic for omnidirectionally alleviating vibrations by making them immovable relative to each other. The provision of a similar spacing is also possible in the embodiments of FIGS. 7 and 8.

Seventh Form

Figure 10:
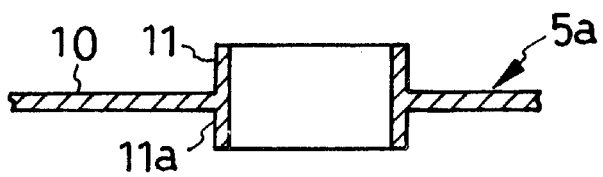
FIG. 10 is a fragmentary axial section through a modified carrier for use in vibration dampers according to the invention.

FIG. 10 fragmentarily illustrates a modified carrier 5a having a hollow boss 11a extending toward the bearing surface, not shown here, of the support in addition to that 11 extending away therefrom. The boss 11a should be spaced from the bearing surface like that of FIG. 8. The modified carrier 5a may be employed in combination with one damping ring with an outside diameter to fit in the hollow bosses 11 and 11a and two other damping rings with an inside diameter to fit over these hollow bosses.

Possible Modifications

Notwithstanding the foregoing detailed disclosure it is not desired that the present invention be limited by the exact showing of the drawings or the description thereof. The following, then, is a brief list of possible modifications or alterations of the illustrated embodiments:

1. Only one or three or more dampers, instead of two as in the foregoing embodiments, may be employed for supporting a desired object of protection.

2. The hollow boss 11 on the web 10 of the carrier 5, which is shown as a tube in all the illustrated embodiments, could take other forms such as, for instance, a plurality of fingers of annular or similar arrangement defining a space for the passage of the smaller diameter portion 15 of the first damping ring 6, or an equivalent part of the other first damping rings 6a, 6b and 6c disclosed.

3. The unitary support 5 may be divided into two or more discrete members each having an end portion bent right-angularly to serve as the noted fingers of annular or like arrangement.

All these and other changes of the illustrated embodiments are intended in this disclosure. It is therefore appropriate that the invention be construed broadly and in a manner consistent with the fair meaning or proper scope of the annexed claims.

What is claimed is:

1. An omnidirectional vibration damper for protecting an object, the damper comprising:

(a) a support having a bearing surface;

(b) a carrier for rigidly carrying an object of protection, the carrier having a first portion laid parallel to the bearing surface of the support, and a second portion extending at right angles with the first portion; and (c) damping means formed from an elastic material and acting between the support and the carrier for damping vibrations both in a plane parallel to the bearing surface of the support and in a direction at right angles therewith.

2. An omnidirectional vibration damper for protecting an object, the damper comprising:

(a) a support having a bearing surface;

(b) a carrier for rigidly carrying an object of protection, the carrier having a first portion laid parallel to the bearing surface of the support, and a second portion extending at right angles with the first portion;

(c) fastener means rigidly coupled to the support, the fastener means having a first portion laid parallel to the bearing surface of the support and farther away therefrom than the first portion of the carrier, and a second portion extending at right angles with the first portion of the fastener means and concentrically with the second portion of the carrier toward the bearing surface of the support; and (d) damping means formed from an elastic material and acting between the first portion of the carrier and the first portion of the fastener means, between the first portion of the carrier and the bearing surface of the support, and between the second portion of the carrier and the second portion of the fastener means, for damping vibrations both in the plane parallel to the bearing surface of the support and in a direction at right angles therewith.

3. The damper of claim 2 wherein the fastener means further comprises a threaded fastener element engaged with the second portion of the fastener means for connecting the same to the support.

4. An omnidirectional vibration damper for protecting an object, the damper comprising:

(a) a support having a bearing surface;

(b) a carrier for rigidly carrying an object of protection, the carrier having a first portion laid parallel to the bearing surface of the support, and a second portion of substantially tubular shape formed in right angular relationship with the first portion;

(c) fastener means having a first portion laid parallel to the bearing surface of the support and farther away therefrom than the first portion of the carrier, a second portion of tubular shape, with an outside diameter less than the inside diameter of the second portion of the carrier, extending at right angles with the first portion of the fastener means and concentrically and with clearance through the second portion of the carrier toward the bearing surface of the support, and a threaded fastener element engaged in the second portion of the fastener means for fastening the same to the support; and (d) damping means formed from an elastic material and acting between the first portion of the carrier and the first portion of the fastener means, between the first portion of the carrier and the bearing surface of the support, and between the second portion of the carrier and the second portion of the fastener means, for damping vibrations both in the plane parallel to the bearing surface of the support and in a direction at right angles therewith.

5. The vibration damper of claim 4 wherein the second portion of the carrier extends from the first portion thereof in a direction away from the bearing surface of the support, and wherein the damping means comprises:
   (a) a first damping ring having a larger diameter portion surrounding part of the second portion of the fastener means and partly engaged between the first portion of the carrier and the bearing surface of the support, and a smaller diameter portion surrounding part of the second portion of the fastener means and surrounded by the second portion of the carrier; and
   (b) a second damping ring surrounding the second portion of the carrier and engaged between the first portions of the carrier and the fastener means.

6. The vibration damper of claim 5 wherein the larger diameter portion and the smaller diameter portion of the first damping ring are separate entities, each having a hole of the same diameter extending axially therethrough for receiving the second portion of the fastener means.

7. The vibration damper of claim 5 wherein the larger diameter portion and the smaller diameter portion of the first damping ring are separate entities, the larger diameter portion having a hole extending axially therethrough for receiving the smaller diameter portion, the smaller diameter portion having a hole extending axially therethrough for receiving the second portion of the fastener means.

8. The vibration damper of claim 5 wherein the first and the second damping rings are of one-piece construction.

9. The vibration damper of claim 4 wherein the second portion of the carrier extends from the first portion thereof toward the bearing surface of the support, and wherein the damping means comprises:
   (a) a first damping ring having a larger diameter portion surrounding part of the second portion of the fastener means and partly engaged between the first portions of the carrier and the fastener means, and a smaller diameter portion surrounding part of the second portion of the fastener means and surrounded by the second portion of the carrier; and
   (b) a second damping ring surrounding the second portion of the carrier and engaged between the bearing surface of the support and the first portion of the carrier.

10. The vibration damper of claim 4 wherein the second portion of the fastener means is in contact with the bearing surface of the support.

11. The vibration damper of claim 4 wherein the second portion of the fastener means is spaced from the bearing surface of the support.

12. An omnidirectional vibration damping system for protecting an object, the damping system comprising:
   (A) support means having a pair of bearing surfaces in parallel spaced relationship to each other;
   (B) carrier means for rigidly carrying an object of protection, the carrier means having a pair of first portions laid parallel to the bearing surfaces of the support means, and a pair of second portions of substantially tubular shape each joined right-angularly to one first portion; and
   (C) a pair of dampers to be disposed on opposite sides of the object of protection and mounted between the support means and the carrier means, each damper comprising:
      (a) fastener means having a first portion laid parallel to one bearing surface of the support and farther away therefrom than one associated first portion of the carrier, a second portion of tubular shape, with an outside diameter less than the inside diameter of each second portion of the carrier, extending at right angles with the first portion of the fastener means and concentrically and with clearance through one associated second portion of the carrier toward one bearing surface of the support, and a threaded fastener element engaged in the second portion of the fastener means for fastening the same to the support; and
      (b) damping means formed from an elastic material and acting between the first portion of the fastener means and one associated first portion of the carrier, between one first portion of the carrier and one associated bearing surface of the support, and between the second portion of the fastener means and one associated second portion of the carrier, for damping vibrations both in a plane parallel to the bearing surfaces of the support and in a direction at right angles therewith.

13. The vibration damping system of claim 12 wherein the pair of dampers are positioned symmetrically with respect to a center of mass of the object being carried by the carrier means.

* * * * *